July 16, 1940.  M. F. BATES  2,207,709
RADIO DRIFT COURSE FINDER
Filed Dec. 13, 1935    4 Sheets-Sheet 1
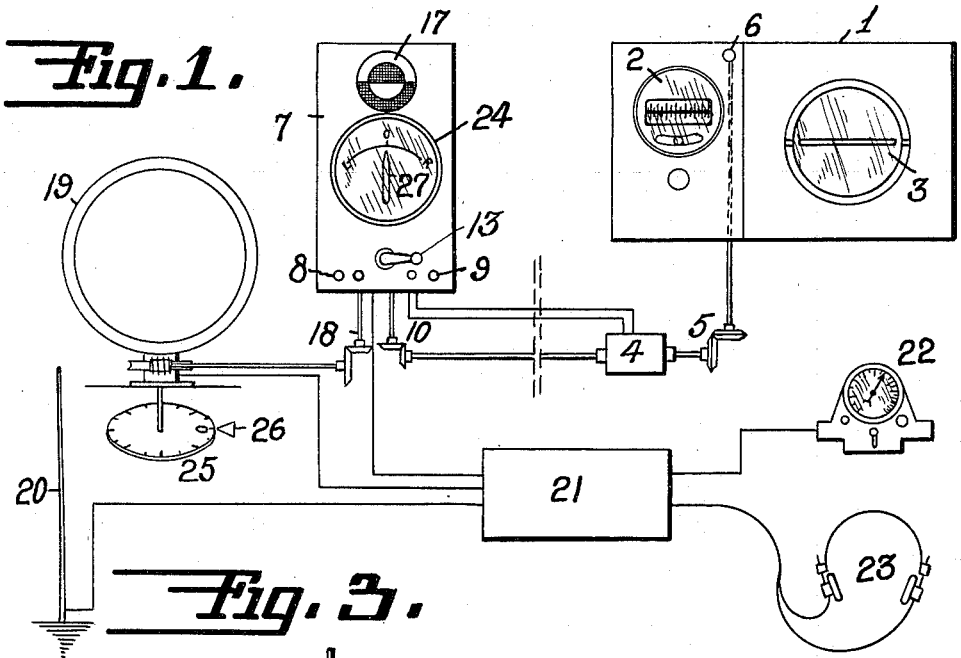
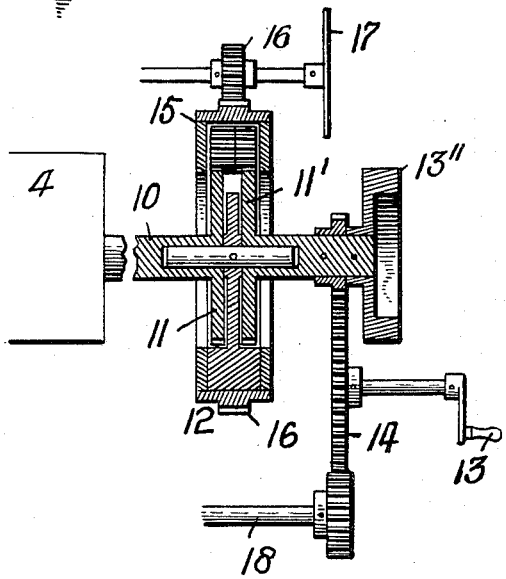
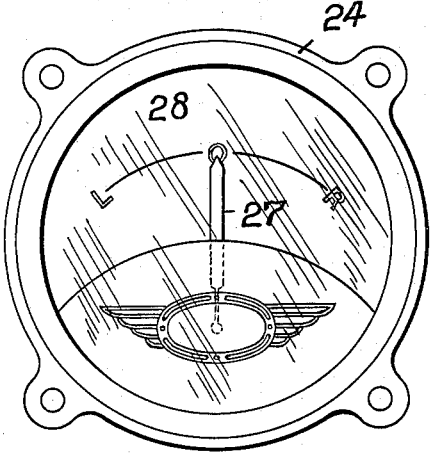
INVENTOR
MORTIMER F. BATES
BY
Herbert H. Thompson
HIS ATTORNEY.

July 16, 1940. M. F. BATES 2,207,709
RADIO DRIFT COURSE FINDER
Filed Dec. 13, 1935 4 Sheets-Sheet 2
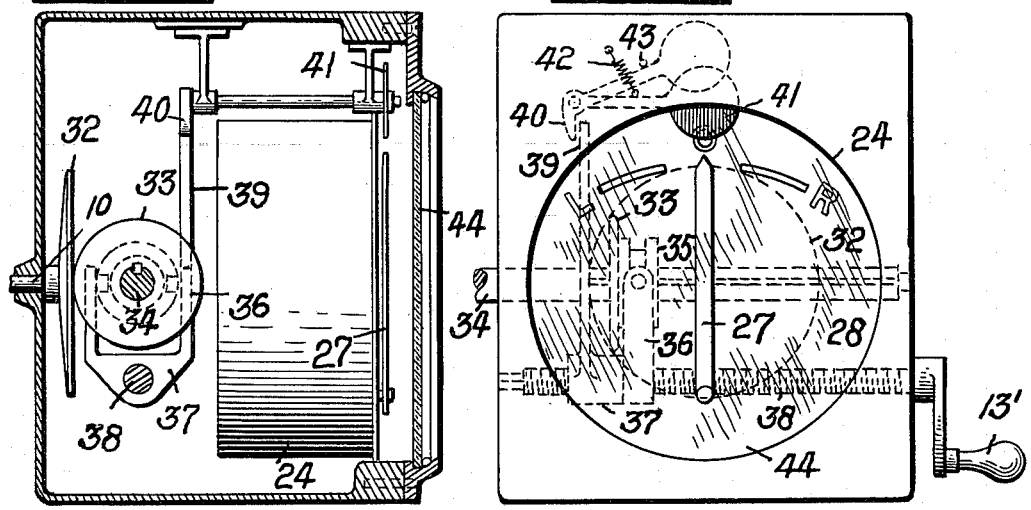
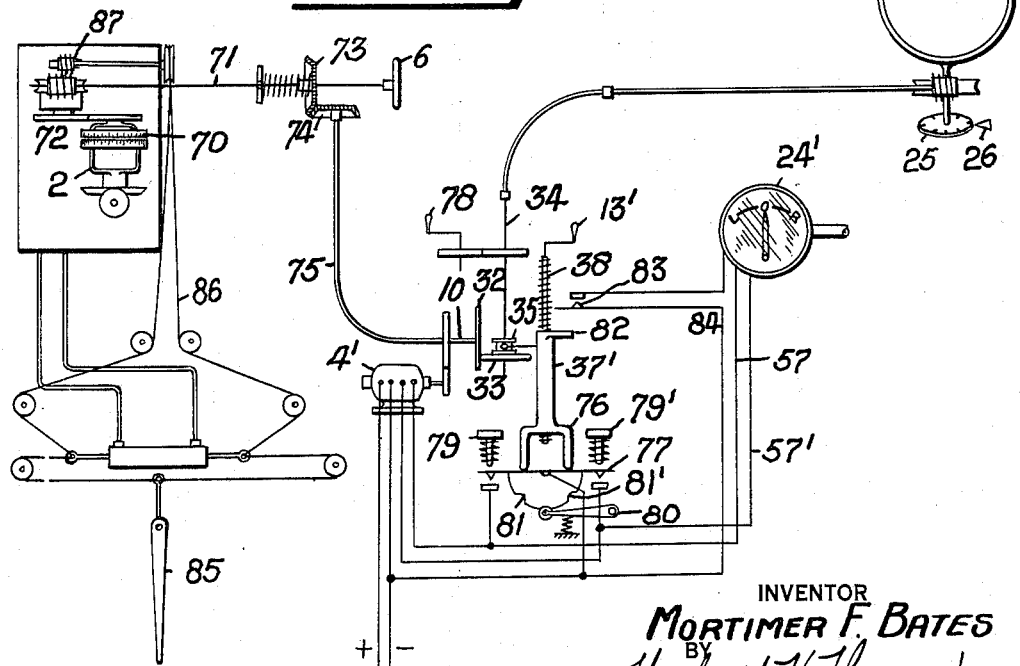
INVENTOR
MORTIMER F. BATES
BY
Herbert H. Thompson
HIS ATTORNEY

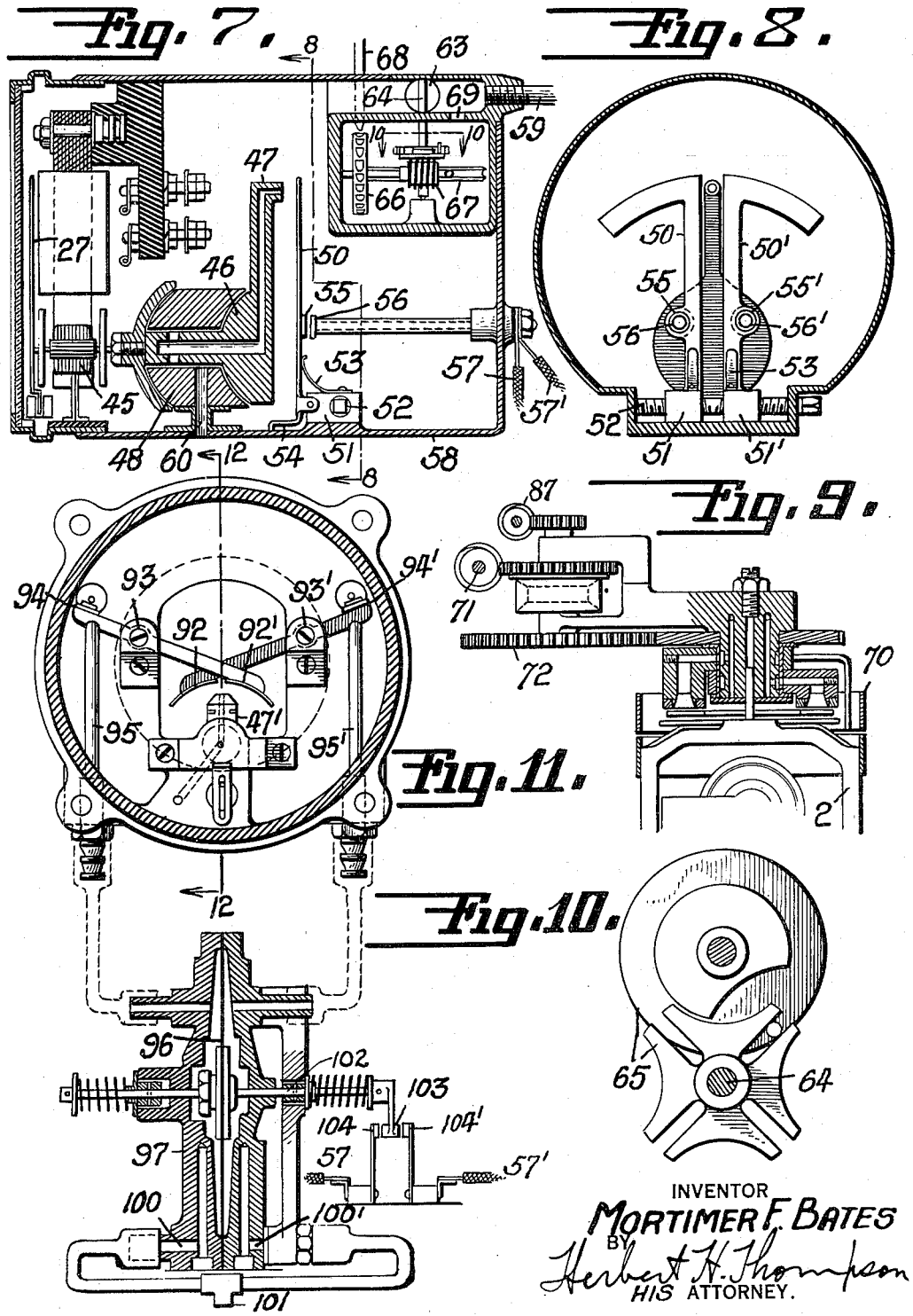

July 16, 1940. M. F. BATES 2,207,709
RADIO DRIFT COURSE FINDER
Filed Dec. 13, 1935   4 Sheets-Sheet 4
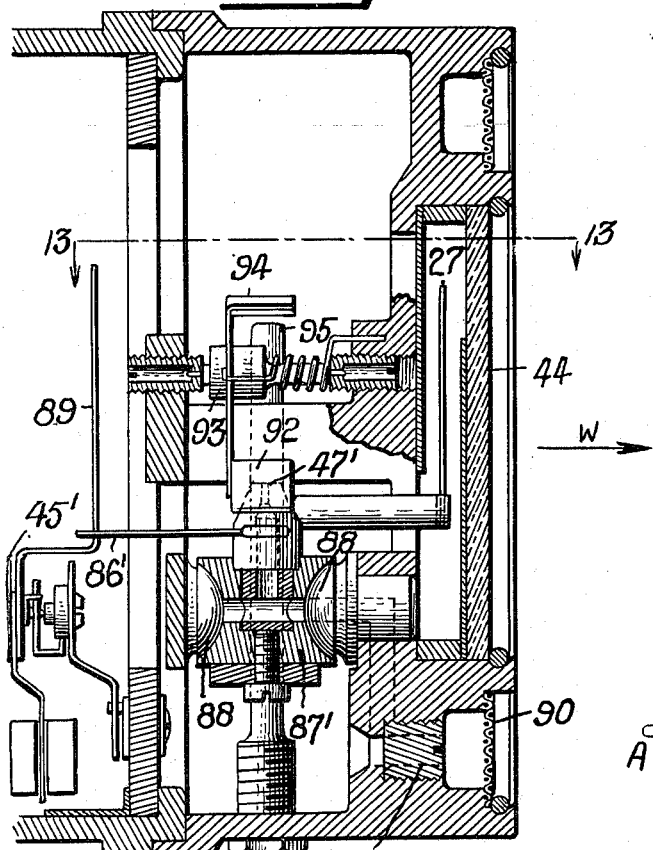
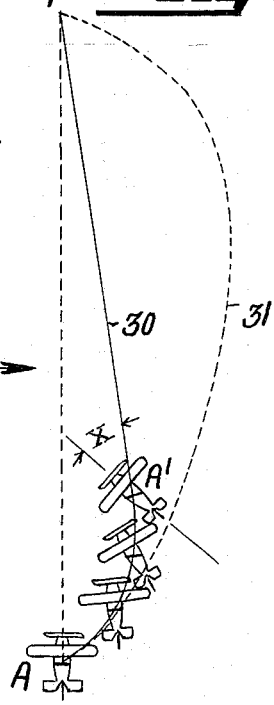
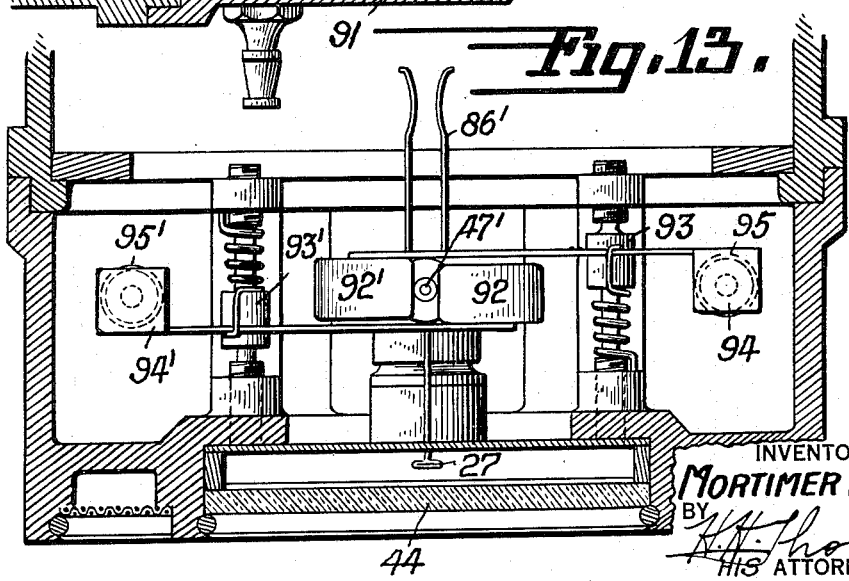
INVENTOR
MORTIMER F. BATES
BY
HIS ATTORNEY Patented July 16, 1940

2,207,709

UNITED STATES PATENT OFFICE 2,207,709

RADIO DRIFT COURSE FINDER

Mortimer F. Bates, Brooklyn, N. Y., assignor to Sperry Gyroscope Company, Inc., Brooklyn, N. Y., a corporation of New York Application December 13, 1935, Serial No. 54,196

19 Claims. (Cl. 172—282)

This invention relates, generally, to direction finding and the invention has reference, more particularly, to a novel radio drift course finder adapted for use on dirigible craft, such as airplanes, ships, etc., whereby the craft may be steered toward a radio sending station in a straight ground track.

Heretofore, it has been difficult or impossible to steer a craft directly and by the shortest possible route to a desired object or destination when such destination is indicated solely by an ordinary radio broadcasting station, i. e., a station not providing a directional beam, and when a cross current and/or wind exists, tending to drive the craft from its course. Ordinarily, in the presence of such a cross current and/or wind the craft will be steered so as to travel along a curved path that may be many miles longer than the direct course to the desired object or destination.

The principal object of the present invention is to provide a novel radio drift course finder that is easily manipulated to provide for the steering of the craft quickly and smoothly onto such heading that the craft will thereafter maintain a substantially straight and hence the shortest possible course to the desired destination, and without the necessity, in the absence of a change in the magnitude or direction of the cross current and/or wind, of changing course as the craft proceeds.

Another object of the present invention lies in the provision of a novel radio drift course finder of the above character that is adapted for use in conjunction with an automatic pilot such as that disclosed in my prior patent, joint with Elmer A. Sperry, Jr., and Bert G. Carlson, No. 1,992,970; the said drift course finder operating through the automatic pilot to obtain in one smooth operation a true ground track to or from a radio station, and without knowledge on the part of the pilot of the force and direction of the wind.

Other objects and advantages will become apparent from the specification, taken in connection with the accompanying drawings wherein the invention is embodied in concrete form.

In the drawings,

Fig. 1 is a diagrammatic view illustrating a typical installation of one form of the novel radio drift course finder of this invention, which form of the invention employs manually operable means for adjusting the loop antenna of the device in azimuth.

Fig. 2 is a view in front elevation of the radio compass indicator employed in the radio drift course finder.

Fig. 3 is a fragmentary, part sectional view of a variable speed mechanism employed in the novel radio drift course finder of this invention.

Fig. 4 is a somewhat modified arrangement showing a fragmentary sectional view of a somewhat different type of variable speed mechanism.

Fig. 5 is a view in front elevation of the structure of Fig. 4.

Fig. 6 is a diagrammatic view of a somewhat modified form of the invention, wherein power means is employed for adjusting the loop antenna in azimuth and wherein control means are operated from the radio compass indicator for maintaining the craft on a determined drift course.

Fig. 7 illustrates an electrical pick-off from the compass indicator employed in the arrangement of Fig. 6.

Fig. 8 is a sectional view taken along line 8—8 of Fig. 7.

Fig. 9 is a fragmentary sectional view of the automatic pilot course setting and follow-up mechanism.

Fig. 10 is an enlarged sectional view taken along line 10—10 of Fig. 7.

Fig. 11 is a sectional view of another type of electrical pick-off from the compass indicator and adapted for use in the arrangement of Fig. 6.

Fig. 12 is an enlarged sectional view taken along line 12—12 of Fig. 11.

Fig. 13 is a sectional view taken along line 13—13 of Fig. 12.

Fig. 14 is a diagram illustrating the action of the radio drift course finder in bringing a craft onto a desired drift course.

Similar characters of reference are used in all of the above views to indicate corresponding parts.

Referring now to Figs. 1 to 3 of the drawings, the reference numeral 1 designates the instrument board view of an automatic pilot having a directional gyro 2 and an artificial horizon 3, the said automatic pilot being preferably of the type disclosed in my prior mentioned patent. An electric servo-motor 4 is connected through suitable transmission means 5 to the course setting knob 6 of the automatic pilot 1. Motor 4 is controlled as from a panel 7, shown as having pairs of start-stop buttons 8 and 9. By actuating buttons 8 the operation of motor 4 in one direction is controlled, whereas by actuating buttons 9 the operation of motor 4 in the reverse direction is controlled. Motor 4, when running, serves to turn the course setting knob 6 in the direction determined by the direction of running of motor 4, whereby the course of the craft is changed at a relatively slow, uniform, desired rate of preferably 1° to 1½° per second in the desired direction, determined by whichever pair of buttons 8 or 9 are actuated.

Motor 4 is also connected through transmission means 10 to one gear 11 of a differential 12, the opposing gear 11' of which differential is adapted to be driven from a crank 13 acting through gearing 14. The arm 15 of differential 12 operates through step-up gearing 16 to rotate an indicator disc 17. Disc 17 is preferably colored radially in contrasting colors, whereby the moment at which the same comes to rest can be easily detected. Crank 13 also acts through gearing 14 and fly wheel 13" to drive transmission shafting 18 connected for turning an antenna loop 19. The angular position of the loop 19 is preferably indicated by turnable dial 25 connected to loop 19, the movement of dial 25 being indicated by reference to a stationary pointer 26.

Antenna loop 19 and a non-directional antenna 20 are connected to a suitable receiving unit 21 for actuating a suitable radio directon indicator or homing device 24. Such radio direction or compass indicators 24 are known in the art and usually employ a polarized indicator in which the indication varies with the phase relationship of the signals received from the two antennae. Receiver 21 is shown as having a tuning dial 22 and binaural ear phones 23. Radio direction or compass indicator 24 is shown as mounted on panel 7. With loop 19 set in its zero position, i. e., with the plane of this loop 19 extending at right angles to the longitudinal or fore and aft axis of the craft, if the craft is headed directly toward a radio transmitting station, the radio compass indicator 24 will read zero, whereas if the craft is headed off to the right of the station, for example, the pointer 27 will turn toward the indicia R on dial 28, showing that the craft must be turned toward the left to again head toward the station.

In use, assume that the craft is in a cross current or wind of unknown velocity and direction and that it is desired to place the craft on that heading which will bring the same by the shortest route, i. e., by a straight ground track, to any desired radio transmitting station, such as a broadcasting station. To accomplish this, the loop 19 is first set in its zero position, i. e., with its plane extending at right angles to the longitudinal axis of the craft. If loop 19 is not initially in its zero position it may be brought to this position by turning crank 13. The desired station is then tuned in on dial 22 and the course changed by turning knob 6, if necessary, until the radio direction indicator 24 reads zero at the moment, thereby indicating that the craft is heading momentarily directly toward the radio station, corresponding to position A of Fig. 14. This course is then held by means of the automatic pilot 1 and, owing to the cross current or wind W, the radio compass meter 24 will soon show drift.

Thus, with the wind in the direction shown in Fig. 14, the drift is to the right of the straight course to station T. The proper button 8 on panel 7 is then pressed for causing motor 4 to operate and turn the course setting knob 6, whereby the craft is started to turn at a slow uniform rate of about 1° per second toward the left, i. e., in the direction to correct for the drift. The motor 4 also operates through transmission means 10 to drive gear 11 of differential 12 so that arm 15 is rotated and acts through step-up gearing 16 to turn indicator disc 17 at a fairly high rate of speed. The operator now turns crank 13 so as to keep the reading of the compass indicator 24 at zero, i. e., by turning crank 13 in the proper direction and speed this crank 13 acts through gearing 14 and transmission means 18 to turn loop 19 so that the axis of this loop remains on the station. By referring to Fig. 14 it will be noted that while the craft is turning toward the left, the loop 19 is turning toward the right with respect to the craft. At first, i. e., when the craft first starts to turn, the crank 13 need be turned but slowly to keep the indication of meter 24 at zero, but as the turn continues, the rate of turning of crank 13 must increase in order to keep the meter at zero. As the crank 13 is turned, gearing 14 drives gear 11' of differential 12 in the direction opposite to that of gear 11, thereby tending to slow up the speed of disc 17. As the speed of crank 13 and hence that of loop 19 increases, a point is finally reached when the rate of turning of loop 19 toward the right is equal and opposite to the rate of turning of the craft toward the left, at which moment the indicating disc 17 will come to rest, since at that instant both sides of differential 12 are being driven at the same speed in opposite directions, and the operator immediately operates the proper button 8 to stop the turning of the craft. When the disc 17 thus comes to rest, the loop 19 is rotationally standing still in space, thereby indicating that the craft is at A' on a drift course which, if maintained by keeping the craft on its present heading and at the drift angle X, will lead the craft directly to the station T over a straight ground course 30.

If the novel radio drift course finder of this invention were not used, the craft would travel along the curve 31 in Fig. 14. Actual flying conditions are exaggerated in this figure for the sake of clearness. Thus, in practice the distance A to A' during which the craft is arriving at a straight ground track is much shorter than that shown in the figure, so that course 30 substantially coincides with the straight line AT, whereas course 31 would be miles to the right of line AT.

In the slightly modified arrangement shown in Figs. 4 and 5, the antenna loop 19 of Fig. 1 is power driven and the crank 13' (corresponding to crank 13) is a rate setting means for determining the rate at which the loop 19 will be turned. Thus, in Figs. 4 and 5, the transmission means 10, driven from motor 4, rotates a drive disc 32 that in turn drives a friction disc 33. Friction disc 33 is splined for longitudinal movement on a shaft 34 that is connected for turning the antenna loop 19. The hub 35 of friction disc 33 is grooved and connected by a yoke 36 to a nut 37 on threaded shaft 38 that has the crank 13' fixed thereon. Nut 37 has an arm 39 thereon that extends upwardly for engaging a bell crank lever 40 carrying an indicator disc or flag 41. A spring 42 normally holds disc 41 upwardly against a stop 43 so that this disc is not visible through the window 44. The radio compass indicator 24 is mounted behind the window 44.

In using this form of the invention, when the motor 4 (Fig. 1) is started, the transmission means 10 rotates drives disc 32 while at the same time motor 4 acts through the automatic pilot to turn the craft at the desired slow rate of about 1° or 1½° per second. Friction disc 33 at the beginning of the turn is at the center of the drive disc 32 and the crank 13' is now turned to advance disc 33 over disc 32 so as to keep the reading of compass 24 zero, the shaft 34 for turning the loop 19 being rotated at a gradually increasing rate due to the operation of crank 13'. When the speed of turning of loop 19 with respect to the craft is equal to that of the craft in azimuth but in the opposite direction, the arm 39 will have reached bell crank lever 40 and turned the same so that indicator 41 is moved down so as to be visible through the window 44, thereby indicating to the operator that motor 4 should be immediately stopped as the craft is on the proper drift course.

In the form of the invention shown in Figs. 6 to 10, automatic means is provided for arresting the turning of the craft when the proper drift angle is reached, together with means for making the automatic rudder control subject thereafter to correction by the radio compass indicator. The radio compass indicator 24' of Fig. 6 is shown in detail in Figs. 7 and 8. In these figures the moving coil 45 of the radio compass, instead of being supported in jewel bearings, is carried by a statically balanced air borne member 46 provided with a rearwardly directed air nozzle 47. Member 46 and its supporting bearing 48 are provided with cooperating hemispherical surfaces for maintaining the supporting air film, each of these members having one convex and one concave surface so disposed that all air eddies are deflected toward the rear of the instrument and away from the sensitive meter element 45.

Positioned rearwardly and to the sides of the air nozzle 47 are two independently movable paddles 50 and 50' that are pivoted upon nuts 51 and 51' carried by a right and left hand screw 52. Nuts 51 and 51' carry springs 53 that bias paddles 50 and 50' to their upright positions with their offset lower ends 54 abutting the instrument casing 58. Paddles 50 and 50' carry movable contacts 55 and 55' for cooperating with stationary contacts 56 and 56' connected to leads 57 and 57'.

Casing 58 is arranged to have air withdrawn therefrom through a pipe 59 as by connection to a vacuum pump or Venturi tube, thereby causing atmospheric air to enter passage 60 in bearing 48 to support the member 46 and coil 45 in a substantially frictionless manner. This air discharged from nozzle 47 passes between paddles 50 and 50' (see Fig. 8) without deflecting these paddles so long as the compass indicator 24' reads zero. As soon as the compass indicator moves off the zero position, nozzle 47 is likewise moved so as to direct the air against one of the paddles 50 and 50' depending upon the direction of turning of the compass indicator moving coil 45. With the air thus blowing against one of the paddles, its spring 53 is deflected and the paddle turned back so that its movable contact is caused to engage the cooperating stationary contact, thereby completing a circuit under the proper condition for motor 4' (see Fig. 6), as will further appear. The sensitivity of this electrical pick-off may be varied by adjusting the screw 52 which serves to vary the gap 61 between the paddles 50 and 50'.

Although the moving element 46 and nozzle 47 are made as light as possible, they nevertheless increase the moment about the meter coil axis to such an extent that damping means is desirable. This damping is accomplished by withdrawing the fluid support from member 46 periodically, to cause periodic arresting of member 46. A butterfly valve 63 is positioned in the passage leading to air outlet pipe 59, which valve has its stem 64 (Figs. 7 and 10) intermittently turned by a Geneva gear 65 that is driven from a small turbo-flywheel 66 through worm and wheel reduction gearing 67. Turbo-flywheel 66 is driven by an air jet supplied through a pipe 68 connected to the atmosphere, suction from pipe 59 exerted through a port 69 serving to cause the jet to operate. Preferably, the valve drive is such that the fluid support for member 46 is withdrawn for a period of one half second at one half second intervals, which is sufficient to make the device practically dead beat.

Referring now to Fig. 6, 70 is the change course dial of the automatic pilot directional gyro 2, the said dial being adapted to be turned from course setting knob 6 through shafting 71 and gearing 72 (see also Fig. 9). A friction mounted bevel gear 73 is adapted to be driven from a mating gear 74 that in turn is driven from the reversible servo-motor 4' through reduction gearing and a flexible shaft 75. Parts 10, 13', 32, 33, 34, 35 and 38 are similar to corresponding parts of Figs. 4 and 5 and hence are correspondingly numbered. Nut 37' on shaft 38 has a forked end 76 for actuating a double throw switch 77 to its centralized off position, i. e., when nut 37' is run out by turning crank handle 13' until the loop antenna 19 becomes stationary in space. A crank 78 is provided for setting the loop antenna to zero as indicated by dial 25 and pointer 26.

In use, in determining a drift course, the friction disc 33 is set almost at the center of drive disc 32 by handle 13', but leaving contacts 83 open, and the loop 19 is set at zero by turning crank 78 if necessary. The craft is then headed directly for the desired station by turning knob 6 till compass indicator 24' reads zero. The indicator 24' will thereafter soon indicate drift due to the cross current or wind and the proper button 79 or 79' of double throw switch 77 is actuated to operate motor 4' in the proper direction to turn the change course dial 70 and hence the craft at a steady rate of about 1° per second to correct for drift. Spring pressed lever 80, by entering one of the notches 81 or 81', serves to retain switch 77 in its engaged position. Crank 13' is turned to advance friction disc 33 over drive disc 32 so as to turn loop 19 and maintain indicator 24' at zero. Just as the craft and loop 19 are turning at the same rate in opposite directions, i. e., with loop 19 stationary in space, the forked end 76 of nut 37' will engage switch 77 and center the same in the off position, thereby stopping motor 4' with the craft headed on the proper drift course. The operator now runs the nut 37' back so that the friction disc 33 is at the center of drive disc 32, at which time an arm 82 on nut 37' will close contacts 83, thereby preparing the circuit through common lead 84 so that the paddle actuated contacts 55, 56 and 55', 56' of meter 24' (see Figs. 7 and 8) are thereafter effective to automatically control motor 4' when small deviations from the true drift course are indicated by the compass indicator 24', the indicator 24' thusly serving to hold the craft on the correct drift course. In Fig. 6, 85 designates the craft rudder, and flexible connector 86 and gearing 87 the rudder follow-up to the automatic pilot.

Figs. 11 to 13 show a somewhat modified form of electrical pick-off from the radio compass indicating meter. In these figures the compass coil 45' acts through member 89 and fork 86' to turn a nozzle 47' about a horizontal axis, the nozzle 47' being carried by a statically balanced air borne member 87' supported from hemispherical end bearings 88. Air for supporting member 87' and for nozzle 47' is supplied through screen 90 and passage 91. Nozzle 47' directs air between two paddles 92 and 92' pivoted at 93 and 93' and carrying projections 94 and 94' for closing the open upper ends of pipes 95 and 95'.

The air pressure from pipes 95 and 95' is transmitted to opposite sides of a piston or flexible diaphragm 96, which divides into two parts the interior space within the housing 97. Air is continuously withdrawn from both sides of the diaphragm through apertures 100 and 100' connected to the common exhaust pipe 101 leading to a venturi or pump.

In use, when the craft moves off the set drift course, the nozzle 47' is tilted so as to direct air against one of the paddles 92, 92' depending on the direction of the deviation, thereby causing such paddle to swing up so that its projection 94 or 94' swings down to close the top of the corresponding pipe 95 or 95', whereby the pressure in the pipe thus closed drops, causing diaphragm 96 to move to the right or left, carrying with it stem 102 secured thereto and effecting engagement of movable contact 103 with one of the stationary contacts 104 or 104' connected to leads 57 and 57' leading to motor 4', thereby effecting the desired operation of this motor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In combination with a craft, of course changing means therefor, and a radio drift course finder including a motor connected for setting said course changing means, a turnable directional antenna, means for turning said antenna to maintain the same parallel to a wave front, and means responsive to the relative speeds of turning of said antenna with respect to the craft and of the craft in azimuth and operable at the moment those speeds are the same, but in opposite directions, to stop the turning of the craft.

2. In a radio drift course finder for dirigible craft, means for causing the craft to turn in azimuth at a predetermined rate toward the proper drift course, a directional antenna, means for turning said antenna to hold the same on a desired broadcasting station while so turning the craft, and means responsive to the relative turning speeds of the craft in azimuth and of said antenna with respect to the craft for determining the time to stop the turning of the craft, said time obtaining at the moment said antenna is angularly stationary in space.

3. In a radio drift course finder for dirigible craft, means for causing the craft to turn in azimuth at a predetermined rate toward the proper drift course, a directional antenna, means for turning said antenna to hold the same on a desired broadcasting station while so turning the craft, means responsive to the relative turning speeds of the craft in azimuth and of said antenna with respect to the craft for determining the time to stop the turning of the craft, said time obtaining at the moment said antenna is angularly stationary in space, and means for holding the craft on the desired drift course, said last named means being responsive to change in the electrical output of said directional antenna.

4. In a radio drift course finder for dirigible craft, means for causing the craft to turn in azimuth at a predetermined rate toward the proper drift course, a turnable directional antenna, a radio compass responsive to the electrical output of said antenna, means for so turning said antenna whereby said radio compass may be caused to remain at zero position during turning of the craft, and means responsive to the relative turning speeds of said antenna with respect to the craft and of the craft in azimuth and operable at the moment said antenna is angularly stationary in space for indicating the time to stop the turning of the craft.

5. In a radio drift course finder for dirigible craft, means for causing the craft to turn in azimuth at a predetermined rate toward the proper drift course, a turnable directional antenna, a radio compass responsive to the electrical output of said antenna, means for so turning said antenna whereby said radio compass may be caused to remain at zero position during turning of the craft, and means responsive to the relative turning speeds of said antenna with respect to the craft and of the craft in azimuth and operable at the moment said antenna is angularly stationary in space to stop the turning of the craft.

6. In a radio drift course finder for dirigible craft, a turnable directional antenna, a radio compass responsive to the electrical output of said antenna, transmission means for turning said antenna whereby said radio compass may be caused to remain at zero position during the turning of the craft toward a drift course, an indicator, gearing connected to said indicator and operated in response to the relative turning movements of said antenna with respect to the craft and of the craft in azimuth, whereby said indicator is caused to show when said antenna is angularly stationary in space.

7. In a radio drift course finder for dirigible craft having steering means, a turnable directional antenna, a compass indicator operated in response to the output of said antenna, a reversible motor for controlling said steering means, manually operable means for turning said antenna, differential gearing driven from said motor and from said manually operable means, and usable in conjunction with said compass indicator, for indicating when said directional antenna is angularly stationary in space so that said motor may be stopped with the craft on a desired drift course.

8. In a radio drift course finder for dirigible craft having steering means, a turnable directional antenna, a compass indicator operated in response to the output of said antenna, a reversible motor for controlling said steering means, and for turning said directional antenna, control means for determining the rate of turning of said directional antenna, whereby said compass indicator is not deflected, and indicator means operated from said control means for showing when said directional antenna is angularly stationary in space.

9. In a radio drift course finder for dirigible craft having steering means, a turnable directional antenna, a compass indicator operated in response to the output of said antenna, a reversible motor for controlling said steering means and for turning said directional antenna, control means for determining the rate of turning of said directional antenna, whereby said compass indicator is not deflected, and switch means operated from said control means when said directional antenna is stationary in space to effect the stopping of said motor.

10. In a radio drift course finder for dirigible craft having steering means, a turnable directional antenna, a compass indicator operated in response to the output of said antenna, a reversible motor for controlling said steering means and for turning said directional antenna, control means for determining the rate of turning of said directional antenna, whereby said compass indicator is not deflected, switch means operated from said control means when said directional antenna is stationary in space to effect the stopping of said motor with the craft headed on a desired drift course, and an electrical pick-off from said compass indicator cooperating with said control means for controlling said motor to thereafter retain the craft on said desired drift course.

11. In an automatic pilot for aircraft with homing radio control, a directional antenna, a course maintaining gyro, motor means for turning said directional antenna and for setting said gyro, a radio compass indicator responsive to the electrical output of said directional antenna, and a reversing pick-off from said radio compass indicator for causing said motor means to operate in either direction.

12. In a gyro pilot with homing radio control, a directional antenna, a course maintaining gyro, motor means for turning said directional antenna and for setting the course from said gyro, a radio compass indicator responsive to the electrical output of said directional antenna, and a pick-off from said radio compass indicator for controlling said motor means, said pick-off comprising an air nozzle movable by the movable element of said radio compass indicator, and electrical contact controlling paddles selectively actuated by air from said air nozzle.

13. In a gyro pilot with homing radio control, a directional antenna, a course maintaining gyro motor means for turning said directional antenna and for setting the course from said gyro, a radio compass indicator responsive to the electrical output of said directional antenna, and a pick-off from said radio compass indicator for controlling said motor means, said pick-off comprising an air borne air nozzle movable by the movable element of said radio compass, means for damping the movements of said nozzle, paddles selectively actuated by said air nozzle, and contacts in the circuit of said motor controlled by said paddles.

14. In an automatic steering gear for aircraft, a radio drift course finder including means for causing the craft to turn at a predetermined slow rate, a turnable directional antenna, means for turning said antenna to maintain the same parallel to a wave front, and means responsive to the relative speed of turning of said antenna with respect to the craft and of the craft in azimuth for determining the time of stopping of said first named turn causing means, whereby the craft is brought on a straight ground course toward the sending station.

15. In a gyro pilot with homing radio control, a directional antenna, a course maintaining gyro, motor means for turning said directional antenna and for setting the course from said gyro, a radio compass indicator responsive to the electrical output of said directional antenna showing left and right deviations from course, a pneumatic pick-off from said radio compass indicator, and electric contacts operated thereby for controlling said motor means.

16. As a means for actuating a power motor from a sensitive indicator, an air borne member actuated by a movable element of said indicator, an air nozzle carried thereby, means for causing air flow for floating said member on an air film and for issuing air from said nozzle, spaced biased paddles or vanes adjacent said nozzle and adapted to be moved by the air jet therefrom on displacement of said indicator, and reversing electrical contacts operated directly or indirectly by the displacement of said paddles for operating said motor.

17. A pick-off attachment for sensitive indicators for controlling a power servo motor, comprising the combination with the sensitive element, an air bearing member coupled thereto for rotation therewith, spherical type air bearings for floating said member for rotation about the axis of said indicator, means for maintaining a differential air pressure within and without said bearing to float said member on a film of flowing air, said member also having an eccentric aperture through which some of said air flow escapes, a pair of biased pivoted vanes adjacent said aperture and adapted to be displaced by the jet issuing therefrom upon movement of said aperture, and differential power means controlled by the relative movement of said vanes for controlling said servo motor.

18. In a radio homing attachment for an automatic pilot for aircraft, the combination with a radio compass indicator of an air borne member connected with the movable element thereof, an air nozzle carried by said member, means for causing air flow for floating said member on an air film and for issuing from said nozzle, a biased pivoted vane adjacent said nozzle and adapted to be moved by the jet therefrom upon displacement of said indicator, and power means controlled by the movement of said vane for altering the course steered by said automatic pilot.

19. In an automatic pilot for craft with homing radio control, a radio directional loop rotatably mounted on the craft, means for causing turning of the craft through the automatic pilot, means for turning said loop to maintain it on the sending station, means for detecting cessation of the loop turning in space by comparing the rate of turn of the craft in one direction with the rate of turn of the loop in the opposite direction, and means responsive thereto for stopping turning of the craft, whereby a straight ground course to the sending station is thereafter pursued.

MORTIMER F. BATES.